(12) United States Patent
Pikarski

(10) Patent No.: US 12,466,046 B2
(45) Date of Patent: Nov. 11, 2025

(54) TO POWER TOOL APPARATUS

(71) Applicant: Power Box AG, Zug (CH)

(72) Inventor: Daniel Pikarski, Somerset (GB)

(73) Assignee: Power Box AG, Zug (CH)

( * ) Notice: Subject to any disclaimer, the term of this patent is extended or adjusted under 35 U.S.C. 154(b) by 0 days.

(21) Appl. No.: 18/261,217

(22) PCT Filed: Jan. 21, 2022

(86) PCT No.: PCT/EP2022/051395
§ 371 (c)(1),
(2) Date: Jul. 12, 2023

(87) PCT Pub. No.: WO2022/161878
PCT Pub. Date: Aug. 4, 2022

(65) Prior Publication Data
US 2024/0066677 A1   Feb. 29, 2024

(51) Int. Cl.
*B25F 5/00* (2006.01)
*B27C 5/10* (2006.01)
*H02H 7/08* (2006.01)

(52) U.S. Cl.
CPC .......... *B25F 5/00* (2013.01); *B27C 5/10* (2013.01); *H02H 7/0833* (2013.01)

(58) Field of Classification Search
CPC ..... B25F 5/00; B27C 5/10; B27C 5/02; B27C 5/06; B27C 9/02; H02H 7/0833; Y10T 409/306608; Y10T 409/308176; Y10T 409/308624; Y10T 409/307952; Y10T 408/65
See application file for complete search history.

(56) References Cited

U.S. PATENT DOCUMENTS

2007/0097566 A1\* 5/2007 Woods .................. B24B 23/028
361/33
2008/0099104 A1\* 5/2008 Bradley ................... B27C 5/02
144/286.5

FOREIGN PATENT DOCUMENTS

| EP | 2 874 308 A1 | 5/2015 | |
| WO | WO 03/000451 A2 | 1/2003 | |
| WO | WO-2021228644 A1 \* | 11/2021 | ................ B25F 5/02 |

OTHER PUBLICATIONS

International Search Report and Written Opinion from related PCT/EP2022/051395 dated Jun. 24, 2022.

\* cited by examiner

*Primary Examiner* — Veronica Martin
(74) *Attorney, Agent, or Firm* — Woodard, Emhardt, Henry, Reeves & Wagner, LLP

(57) ABSTRACT

The invention relates to a power tool (2), a kit of parts, and method of controlling the operation of the same depending upon the configuration of use of the power tool (2) at an instant of time. The power tool (2) can, in one embodiment be a router power tool to perform work on a workpiece (32), and switching means (28, 42) allow the selective operation of the power tool (2) by controlling an electrical power source. First switching means (28) include a no Voltage release (NVR) function and means are provided to selectively disable the NVR function of the first switching means (28) when the power tool (2) is used in at least one predetermined configuration. Typically, this allows second switching means (42) which include a NVR function to be used to control the power to the tool (2). A fence body for use with a router is also disclosed.

21 Claims, 7 Drawing Sheets

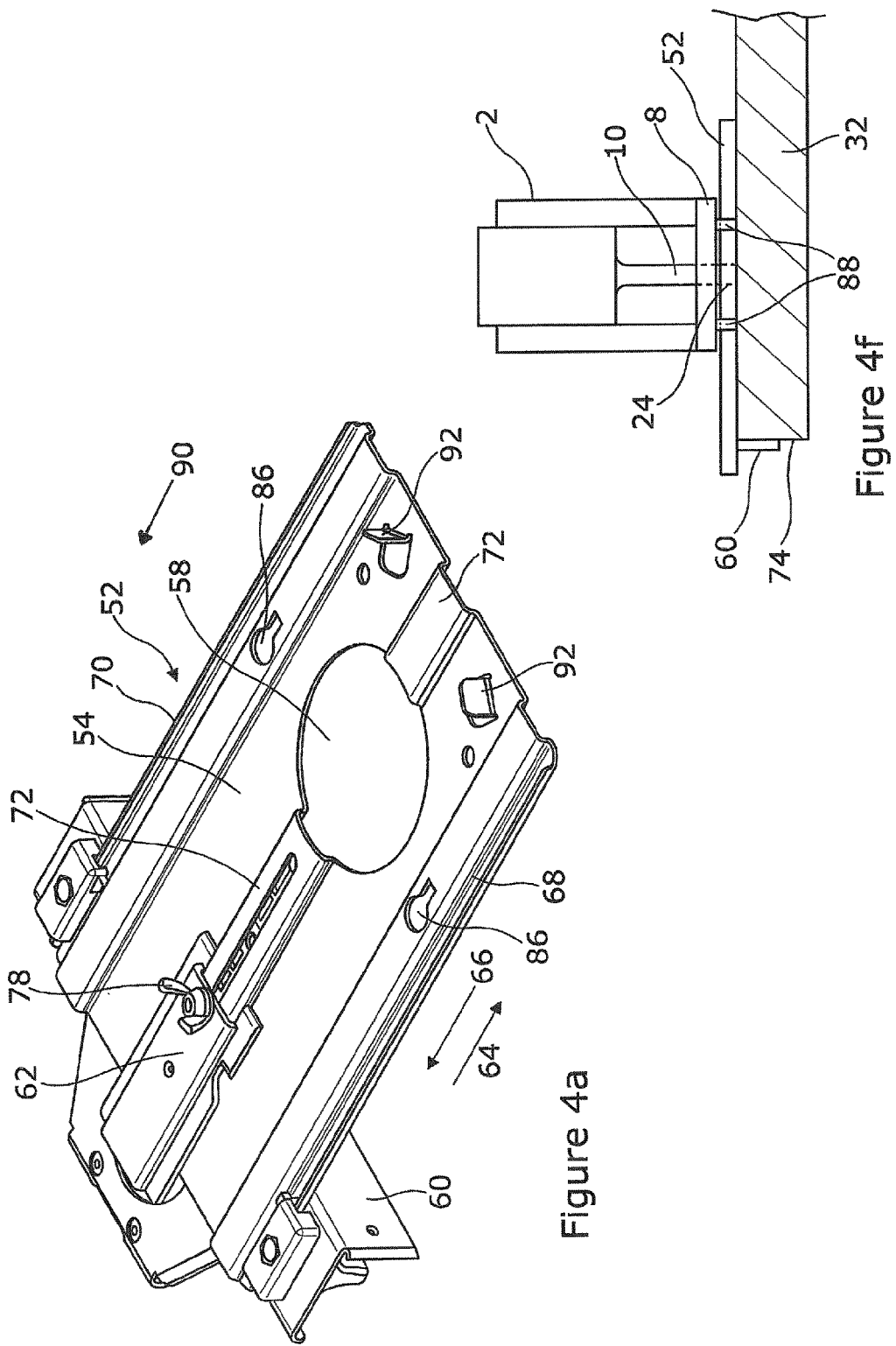

TO POWER TOOL APPARATUS

Figure 1:
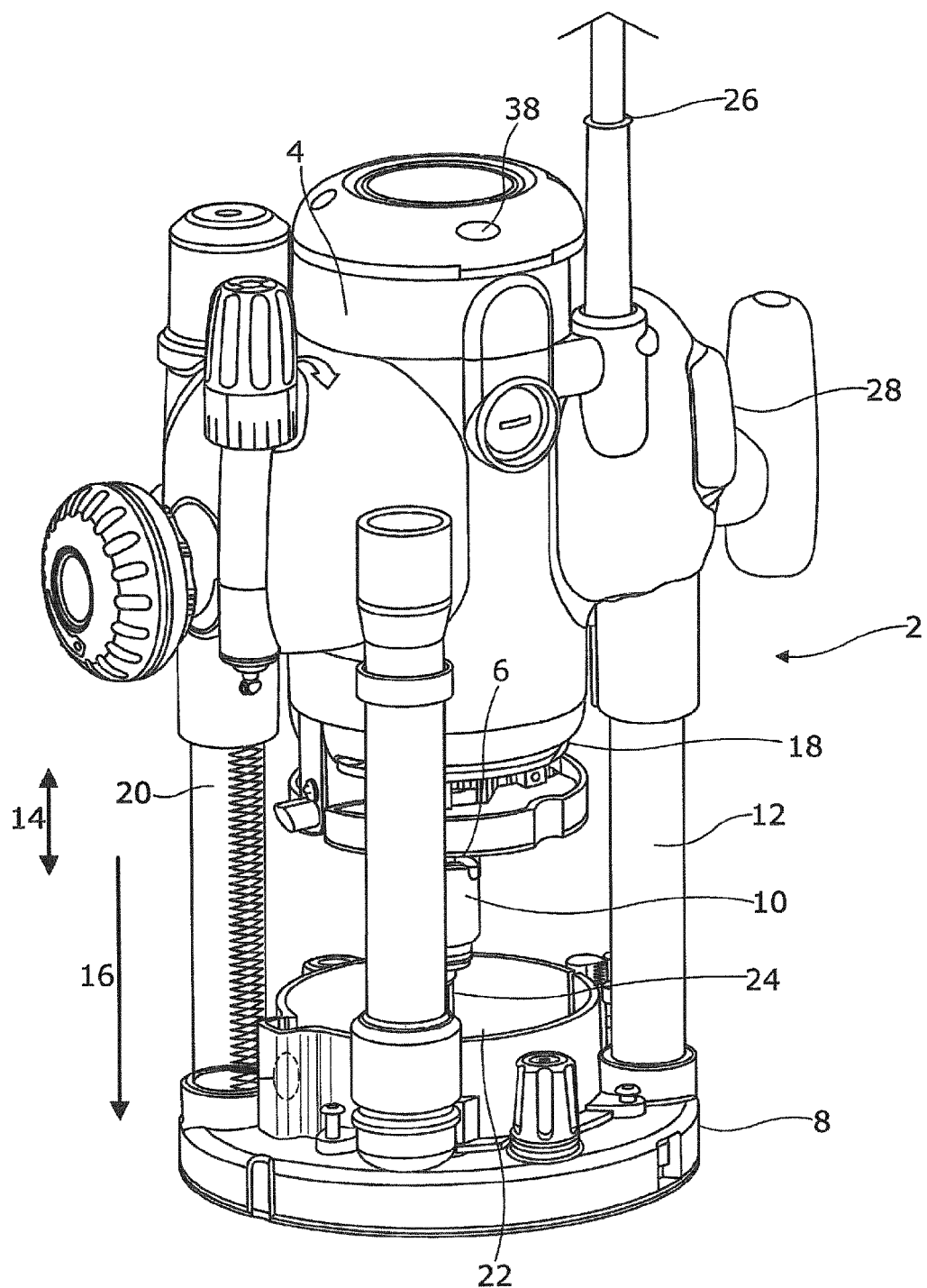

This invention relates to improvements relating to an electric power tool, and particularly, although not necessarily exclusively, a power tool which is provided with electricity, typically from a mains power supply, to operate the same and may be used, at least in certain configurations of use, in conjunction with at least two switching means each of which are capable, when operated, of switching the power supply to the power tool on and off so as to control the operation of the same.

One form of the power tool is that which is commonly known as a router or milling machine, with the tool being capable of performing work on a workpiece via a rotating cutting head to perform a routing or milling action to form, for example, a channel in a workpiece.

It should be noted that although specific reference is made herein to a router power tool, this is in a non-limiting manner and does not preclude the use of the invention or parts thereof in relation to other power tools where a similar advantage can be obtained.

The router can typically be mounted for use in first and second configurations, a first configuration above a worksurface or worktable and a second configuration below a worksurface or worktable and on which the workpiece is located. The workpiece is typically located on the top side of the worksurface and, when the router is configured to be used above the worksurface, the movement of the tool is typically guided by hand or alternatively the workpiece on which the work is being performed is moved with respect to the tool as the cutting head of the tool rotates. When the tool is in the second configuration of use the power tool is typically attached to the work surface or worktable.

The position of the cutting head with respect to the proximity to the work surface and the movement of the housing of the tool with respect to a base of the tool is adjusted by a winding mechanism.

The router tool housing has a motor located therein which is provided to rotate a shaft on which a tool holder and the cutting head are mounted. The shaft, tool holder and cutting head are aligned along the longitudinal axis of the shaft so that the shaft, tool holder and cutting head all rotate about said axis. The cutting head is located at a level with respect to a baseplate of the power tool so as to define, adjustably, the depth of routing or milling which is performed by the cutting head as it rotates and moves along the workpiece.

The router tool is required to be provided with a number of safety features in order to allow the controlled operation of the same by an operator who may be skilled or unskilled.

The power supply to the motor is controlled via a switch mechanism typically provided on the housing and this is the switch which is conventionally used when the router tool is located above the worksurface in the first configuration. However, when the router tool is used in the second configuration under the worksurface, it can be difficult or impossible for the user of the power tool to be able to safely reach the switch mounted on the housing of the power tool. As such, it is known to provide a second switching means, referred to as a switchbox, which can be mounted on the worksurface, typically at an edge thereof, or connected remotely from the router tool housing and which is connected to the motor of the router power tool so as to allow the operator to switch the power tool on or off via the second switching means rather than having to use the first switching means on the housing of the power tool.

The said first and second switching means are conventionally both provided with a no-voltage release (NVR) function which operates when a cut or outage of the power supply to the power tool occurs and is detected and the function acts to turn the first and second switching means to an off position automatically. This therefore means that when the operator next uses the power tool, the first and second switching means have to be moved to an on position once again.

It is found that when the power tool is in the second configuration of use then if the second switching means is used to switch off the router during the regular operation in terms of a regular and intended switch off this effectively cuts the power supply to the power tool and the NVR function of the first switching means on the housing of the router is triggered as it detects a power failure.

Thereafter, as the NVR function of the first switching means has operated, this prevents the second switching means from being used by the operator to subsequently switch the router power tool back on as the first switch means on the router housing still has the NVR function in position. This, in turn, means that the operator is forced to gain access to the router housing underneath the worksurface and operate the first switching means off and then on manually to re-set the NVR function of the first switching means on the router housing.

This is unsatisfactory as it exposes the operator to significant risk and/or inconvenience and, potentially leads to user injury whilst reaching under the worktable to manipulate the router's first switching means on the housing and therefore to an extent, defeats the purpose of providing the second switching means.

The aim of the present invention is to ensure that the functionality of the NVR function is maintained and thereby preserves the safety of the operator of the power tool whilst, at the same time, allowing the convenience of operation of the power tool, in at least certain configurations, to be improved.

In a first aspect of the invention, there is provided a power tool, said power tool including a housing, a motor, a shaft to be moved by the motor, a toolholder, a power source connectable to provide electrical power to operate the motor and first switching means to allow the user selective operation of the motor, said first switching means including a no Voltage release (NVR) function and wherein means are provided to selectively disable the NVR function of the first switching means when the power tool is used in at least one predetermined configuration.

In one embodiment the said at least one predetermined configuration, is for the power tool to be usable in conjunction with a second switching means which allows the selective operation of the power tool.

In one embodiment said at least one predetermined configuration is used when the power tool housing is relatively inaccessible to the user, such as when the power tool is mounted on the underside of a worktable and can be provided in electrical connection with a second switching means.

Typically, the second switching means is provided in electrical connection with, but remotely from the housing of the power tool in which the first switching means is located.

In one embodiment the second switching means are located intermediate the power source and the first switching means.

In one embodiment, the second switching means is provided as part of a switchbox mounted or positionable with respect to a worktable or surface on which the workpiece to be operated on by the power tool is located. Typically, the mounting or position is selected so as to be conveniently accessible by a user of the power tool when the power tool is in said at least one predetermined configuration.

In one embodiment, the electrical connection is via a cable connection between the switchbox and the motor within the housing of the power tool. In one embodiment, the cable is the conventional power cable provided with the power tool.

In one embodiment, the disabling system includes a trigger mounted on the power tool and a member which is selectively brought into contact with the trigger and, when in position, the NVR function of the first switching means is disabled. Typically, the remainder of the operating characteristics of the first switching means remains operable so as to allow the switching means to still perform an on/off function when operated.

In one embodiment, the trigger is a microswitch located in the housing as part of the power supply control system for the operation of the power tool.

In one embodiment, the member is insertable to contact with the trigger from a position externally of the power tool housing through a port and into contact with the said microswitch.

In another embodiment, a button or other operating means are provided to allow the said trigger to be moved to a position in which the NVR function of the first switching means is disabled.

Typically, the said member and trigger are provided in a manner so that the same are only operable to disable the NVR function of the first switching means when the power tool is positioned in the said predetermined configuration and second switching means are provided in conjunction therewith.

In one embodiment, the apparatus may include a means to determine when the power tool is in the said predetermined configuration and therefore only render the disabling of the function of the first switching means when that position is detected.

In one embodiment, the said member is only physically movable so as to be capable of being used when the power tool is in second configuration. In one embodiment, this may be achieved by positioning the said member so that in order for the power tool to be moved from the said predetermined configuration, the said member has to be detached or removed from the position with respect to the power tool in which the NVR function of the first switching means is disabled.

In one embodiment the power tool is a router. In one embodiment the said predetermined configuration is when the router power tool is mounted on the underside of the worktable or surface on which the workpiece to be operated on is located.

In one embodiment, the said member is permanently mounted to the underside of the worktable such as on a spiral cable or a self-retracting wire so that the user is forced to remove the member from the router housing in order to be able to move the power tool from the underside of the worksurface and/or the member cannot be moved to a position to act to disable the function when the power tool is in another configuration of use and in which only the first switching means can be used to operate the power tool.

Thus, when the router power tool is in the said predetermined configuration, the first switching means NVR function is disabled and therefore allows the switchbox i.e., the second switching means to function as intended and allow only the second switch means to be used every time to switch the router on and off whilst maintaining the NVR function of the second switching means when the said power tool is in the said predetermined configuration.

In a further aspect of the invention there is provided a kit of parts to allow a power tool to be used in at least first and second configurations and for switching means for the said power tool to be adapted with respect to the particular configuration in which the power tool is to be used at a particular time, said kit comprising a power tool including a housing, a motor for selective operation to rotate a cutting head and first and first switching means and a power supply selectively provided to rotate the motor via operation of the first or second switching means, said second switching means located intermediate the source of the power supply and the first switching and wherein a disabling assembly is provided to selectively allow at least one function of the first switching means to be selectively disabled when the second switching means is to be used to operate the said power tool.

In one embodiment, the kit of parts further includes a worktable and means to allow the power tool to be operated in a first configuration on a top side of the workpiece located on an upper surface of the worktable and a second configuration in which the power tool is operated with respect to the lower side of the workpiece and the power tool is located on the underside of the worktable, said first switching means being used to operate the power tool in the first configuration and second switching means being used to operate the power tool in at least the second configuration and the disabling means are provided to only be capable of operation to disable a function of the first switching means when the power tool is in a second configuration.

In one embodiment, the function of the first switching means which is selectively disabled is the NVR function whilst other functions of the first switching means can still be operated.

In a further aspect of the invention there is provided a method for operating a power tool which is capable of being operated in at least two configurations and wherein, when the power tool is operated in a predetermined configuration, means are provided to be selectively used to disable a function of first switching means of the power tool which are located on the power tool.

Typically, when the said function is disabled, the operation of the power tool and the provision of the disabled function, is provided via second switching means which are physically remote from the power tool but electrically connected to the power tool with the second switching means more conveniently usable by the operator when the power tool is in the predetermined configuration.

In one embodiment, the router is provided to be used in conjunction with a fence body which is provided to be selectively attached to the base of the router. The fence includes an aperture through which the tool passes to perform a working operation on a workpiece which is located on the opposing side of the fence from the tool base and wherein, a fence plate and a guide plate are provided, said fence plate provided to allow adjustment of the fence body with respect to an edge of the workpiece and the guide plate provided to allow adjustment of the effective radius of the circular aperture in the fence body.

In a further aspect of the invention there is provided apparatus including a powered router tool which, in operation performs a work action on a workpiece, and a fence body which is selectively locatable via engagement means to a base of the power tool such that in use the said fence body is positioned intermediate said base and the said workpiece, said fence body including a fence plate and a guide plate and wherein the positions of both the guide plate and fence plate with respect to the fence body are selectively adjustable within a range of adjustment positions.

In one embodiment the fence body includes a receiving means for a ruler or scale to allow measured adjustment of the guide plate with respect to the fence body.

In on embodiment the fence plate is provided to engage with an edge of the said workpiece.

In one embodiment, the guide plate allows a circle of a user selected size to be represented and allow guidance of the cutting tool and the workpiece.

In one embodiment, the fence body includes a channel to allow the selective positioning therein of a ruler or scale and retaining means to allow the ruler or scale, once positioned, to be retained in position so as to act as a measurement guide for the guide plate.

In one embodiment, the fence plate lies at substantially 90 degrees to the fence body, and which acts as a guide surface against which a workpiece or other item can be positioned and in one embodiment, engagement means are provided to allow the engagement on said fence plate of antifriction or sacrificial material which, when in position, form the external surface of said plate.

SPECIFIC EMBODIMENTS OF THE INVENTION ARE NOW DESCRIBED WITH REFERENCE TO THE ACCOMPANYING DRAWINGS WHEREIN

Figure 2A:
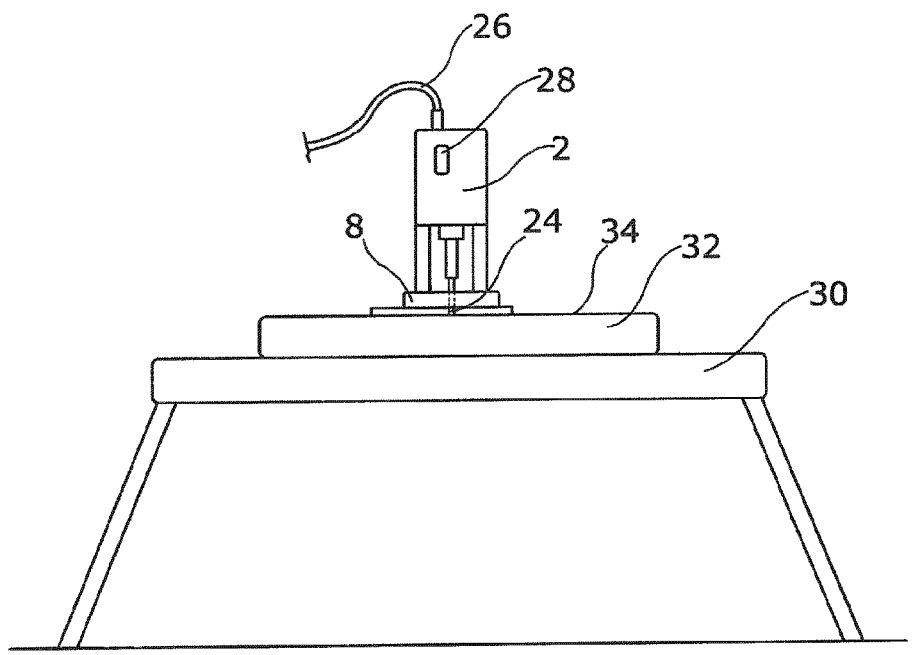
Figure 2B:
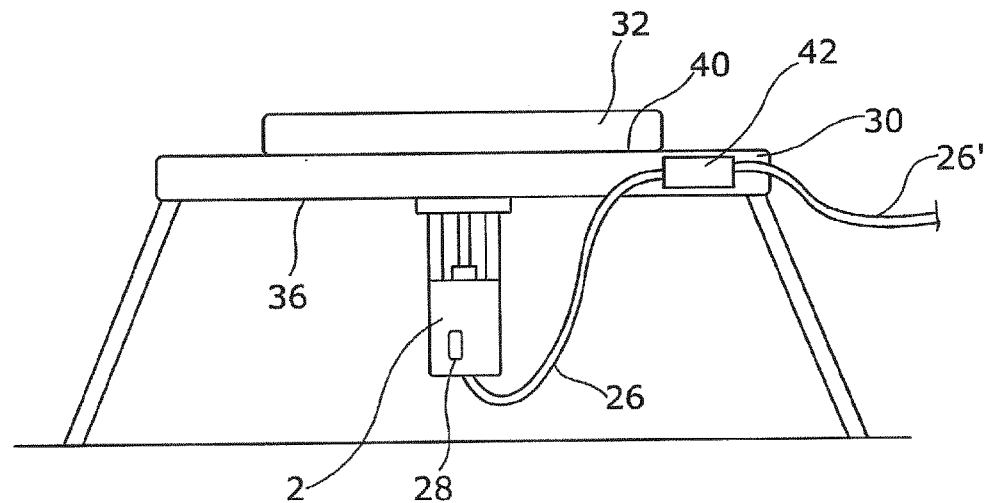
Figure 3A:
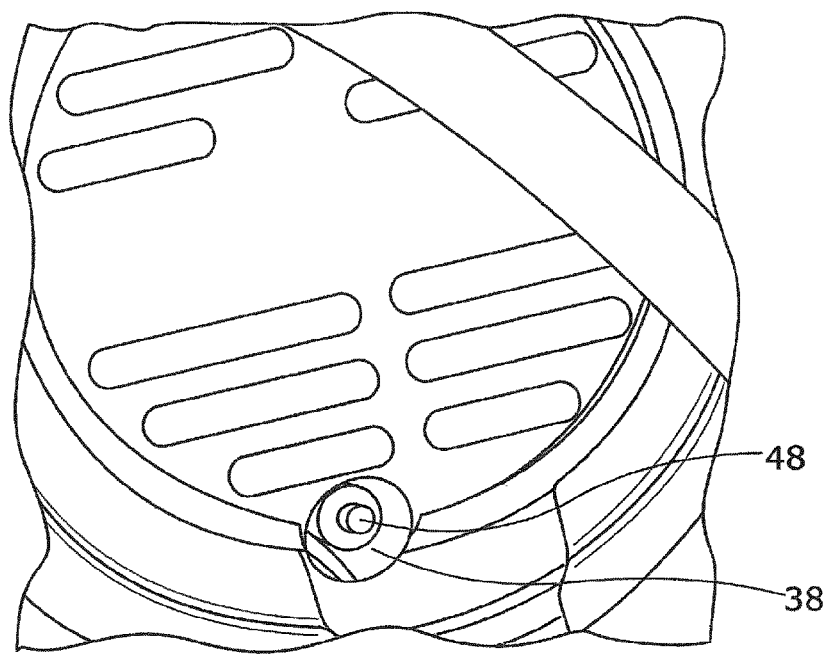
Figure 3B:
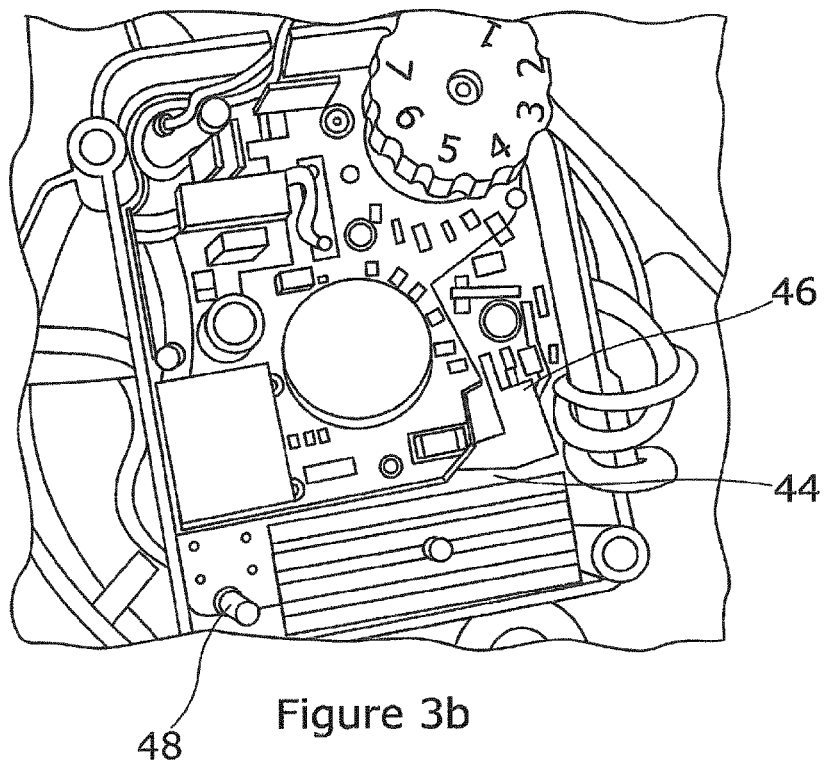
Figure 3C:
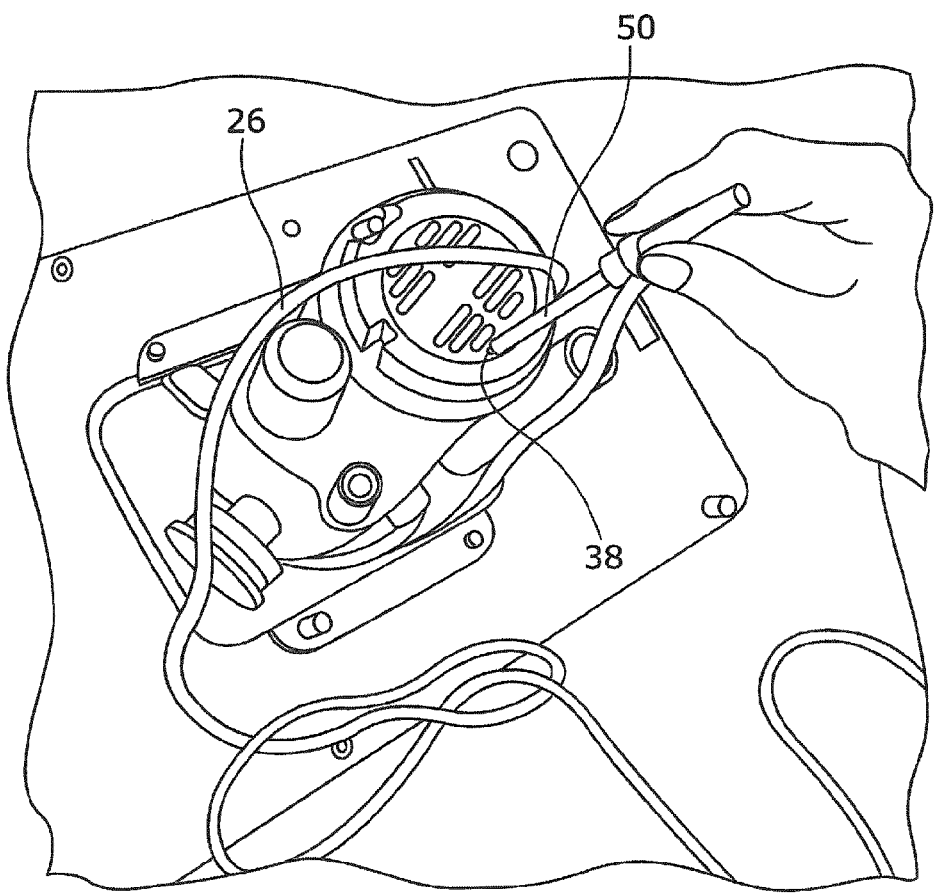

FIG. 1 illustrates a power tool in accordance with one embodiment of the invention;

FIGS. 2a and b illustrate schematically, the router of FIG. 1, in first and second configuration positions for use; and FIG. 3a-c illustrate the housing and control system for a router in accordance with FIGS. 1-2b, in accordance with one embodiment of the invention and illustrating the disablement of the NVR function.

FIGS. 4a-f illustrate a fence for selective use with the router as herein described in relation to FIGS. 1-3c, or with other routers.

Turning firstly to FIG. 1, there is illustrated a router power tool 2 in accordance with one embodiment of the invention.

The power tool includes a housing 4 in which is located a motor which is provided, when powered, to rotate a longitudinal shaft 6 which depends under and down from the housing as illustrated. At the free end of the longitudinal shaft, there is provided a tool holder 10 which allows the selective receipt of the cutting head 24. The particular type and dimensions of the cutting head can be selected by the user of the tool in order to allow a specific milling or routing operation to be performed and there is typically provided a means by which the tool holder can be moved between engaged and released positions. The gap 16 between the underside 18 of the housing, and a base 8 of the router power tool, can be adjusted via adjustment means provided on first and second legs 12, 20 which connect the base to the housing. This therefore allows the depth of the protrusion of the cutting head 24 through the aperture 22 and below the base 8 to be adjusted as indicated by arrow 14 and in turn, the depth of the channel formed in a workpiece into which the cutting head extends, to be adjusted.

FIG. 1 illustrates the router power tool in an orientation in which the cutting head protrudes below the base, but it should be appreciated and as subsequently explained, the router tool can be utilised having being moved through 180 degrees so that the cutting head protrudes above the base.

A power supply is provided to the motor in the housing via a cable 26 which typically allows a mains electricity supply to be provided to the router tool. Intermediate the power supply and the motor, there is provided on the housing, a first switching means 28 which allows the operator to perform an on and off control of the motor and hence the power tool operation. In addition, the switching means is provided with an NVR function which means that if the power supply to the router fails such as a result of a power cut or outage, then the NVR function automatically switches the power tool off. This therefore prevents the inadvertent operation of the router power tool should, for example, the power cut be short-lived, and the power be resumed without the operator being aware of that.

In FIG. 2a, the router power tool 2, is shown in a first configuration of use in conjunction with a worktable 30 which has an upper surface on which a workpiece 32 is positioned. The router power tool is provided on the top face 34 of the workpiece and the cutting head of the tool is positioned below the base 8 to a user selected extent such that when rotated by operation of the motor a channel to the required depth is formed along the upper surface of the workpiece. In this configuration of use, the operator can easily gain access to the first switching means 28 to switch the same on and off.

FIG. 2b illustrates the second and predetermined configuration of use of the power tool 2 in conjunction with the worktable and in this case, the router power tool has been reversed through 180 degrees so that the tool is located on the underside 36 of the worksurface typically by securing means which are provided to pass from the router tool to engagement means on the underside of the worksurface so as to securely locate the router in position and the cutting head protrudes through the aperture in the base and through an aperture in the worktable so as to access the underside 40 of the workpiece so that when the cutting head is operated and the power tool is switched on a channel is formed on the underside of the workpiece.

It will be appreciated that in the second configuration, access to the router power tool generally and in particular, to the first switching means 28, is more difficult to achieve, causes a risk of injury to the user when attempting to gain access to the first switching means and/or creates a potential electrical hazard.

Having recognised this problem, it is common for there to be provided a second switching means 42 which is located remotely from the housing of the power tool and may, in one embodiment, located on or positionable on the worktable 30 or can simply be positioned at a convenient location for the user when using the router power tool in the second configuration.

This second switching means 42, as with the first switching means 28, includes the NVR function and, as the second switching means 42 is located intermediate the power supply source via cable 26' and the cable 26 to provide the power to the router power tool, if a power outage occurs, then the NVR function of the first and second switching means will be triggered but more problematically, if the second switching means is simply turned off, this will cause the NVR function of the first switching means to be operated. and therefore, in order to be able to operate the router power tool thereafter when in the second configuration, the router power tool has to either be removed from the second configuration to allow access to be gained to the first switching means to reset the NVR function or alternatively, the user has to undertake the potentially hazardous task of getting access to the first switching means 28 to rest the NVR function whilst the power tool is in the second configuration. Neither of these options are acceptable and the need to do this generally negates the advantages of providing the second switching means.

In accordance with the invention, this problem is avoided by the provision of a selective disabling means which allows the NVR function of the first switching means to be selectively disabled and, furthermore, to only be disabled when the power tool is located in the second configuration.

As shown in FIG. 3b the interior of the housing includes control circuitry 44 typically provided on a printed circuit board 46 as indicated in FIG. 3b in which the cap of the housing has been removed for ease of illustration.

In accordance with the invention, there is provided a trigger 48 as part of the control means and, as illustrated in FIG. 3a in which the cap of the router housing is shown in position, the cap is provided with an aperture 38 which allows access to the trigger 48 (which is typically a microswitch) from externally of the router power tool.

This external access can be used, to receive therein, a member 50 which may be keyed or otherwise coded to be used with the particular router tool or the specific manufacturer. When the member 50 is successfully positioned into the aperture 38 the same can be used to activate the trigger 48 which, in turn, acts to disable the NVR function of the first switching means 28.

With the first switching means having the NVR function disabled, the same can still be used to provide conventional on and off functionality but, the NVR function will not operate. This therefore means that when the router power tool is in the second configuration on the underside of the worktable, and the said member 50, is in position, if there is a power outage or the second switching means 42 is used to switch the tool off in a normal operating mode, then the NVR function of the second switching means 42 will operate to automatically be activated but, as the NVR function of the first switching means 28 is disabled, no action will occur at the first switching means.

This therefore means that when the power is resumed to the power tool then the NVR function of the second switching means can be easily operated and accessed by the operator to allow the resumption of power to be provided to the power tool but there is no longer any need for the operator to try and gain access to reset the NVR function of the first switching means as this is unaffected when the said member is in position. Thus, the potentially hazardous and injurious requirements to gain access to the first switching means 28 when the power tool is in the second configuration is avoided.

In order to ensure that the advantages can be obtained, but without allowing the safety of the router power tool to be compromised in other uses, the member 50 which allows the disablement of the NVR function of the first switching means 28, is mounted with respect to the router and/or the worktable so that the member can only be extended into the aperture 38 in the housing to operate the trigger 48, when the router power tool is in the second configuration. Thus, if for example, the member 50 is located on a spiral carrier or a retractable cable then the extension of the member from the worktable is only to a sufficient extent so as to reach the trigger 48 when the router power tool is already located in the second configuration or is being moved thereto and not when the router power tool is in the first configuration or separated from the worktable. Thus, it can be ensured that the functionality of the NVR function on the first switching means is retained and cannot be disengaged in any other operating mode or configuration other than one or more predetermined configurations without the user having deliberately dismantled or acted against the safety instructions for use of the power tool.

Figure 4B:
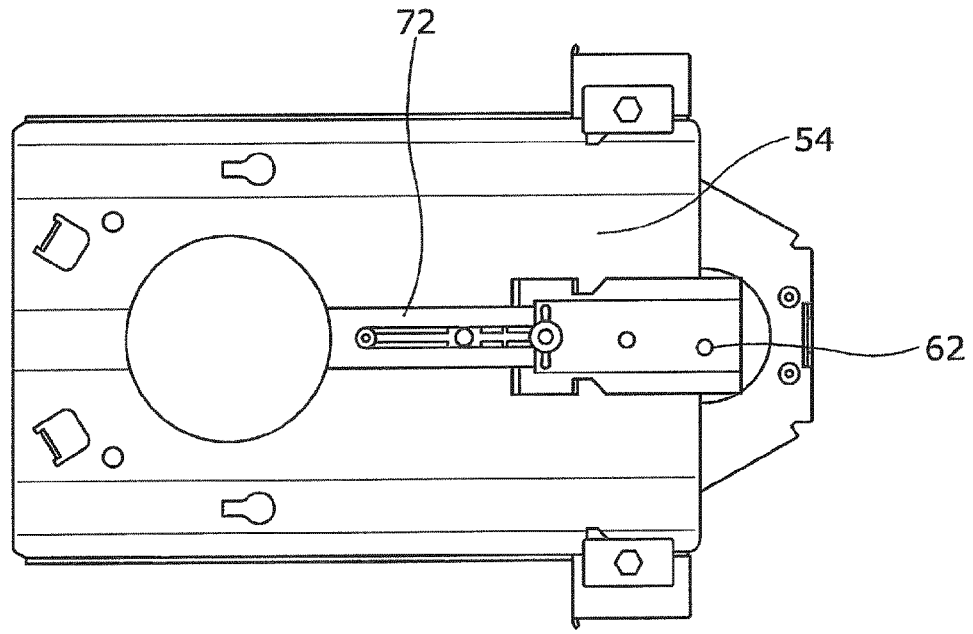
Figure 4C:
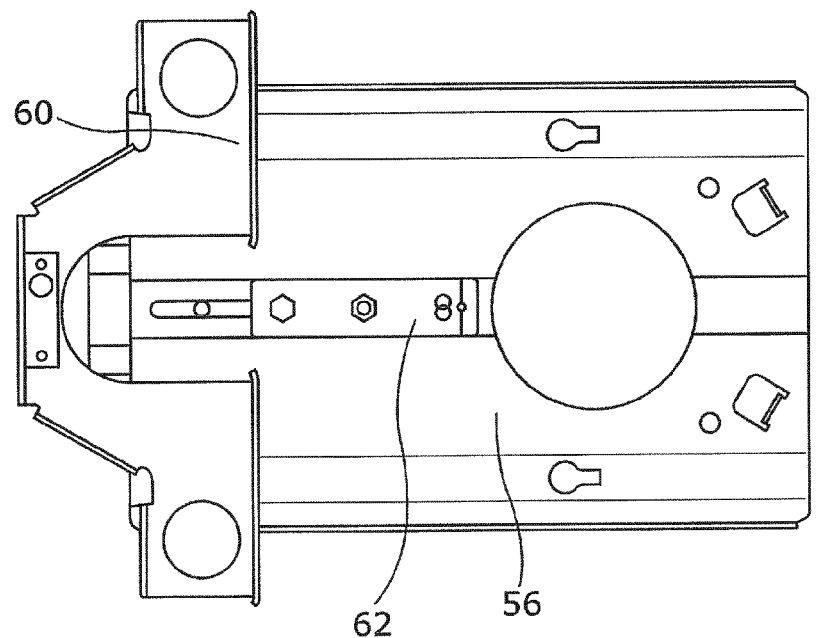
Figure 4D:
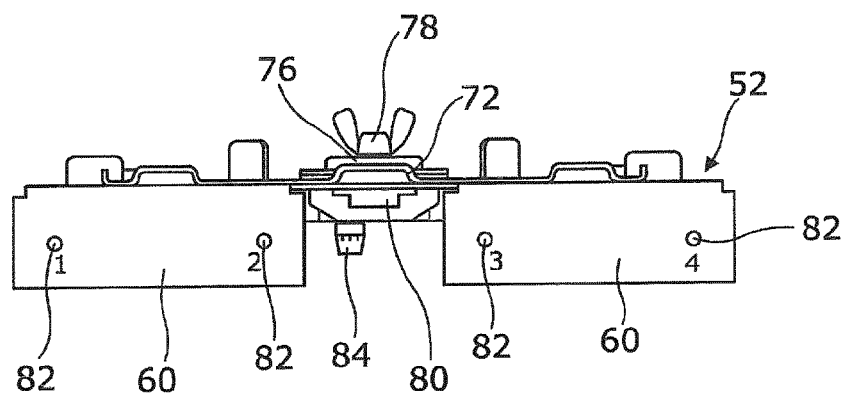
Figure 4E:
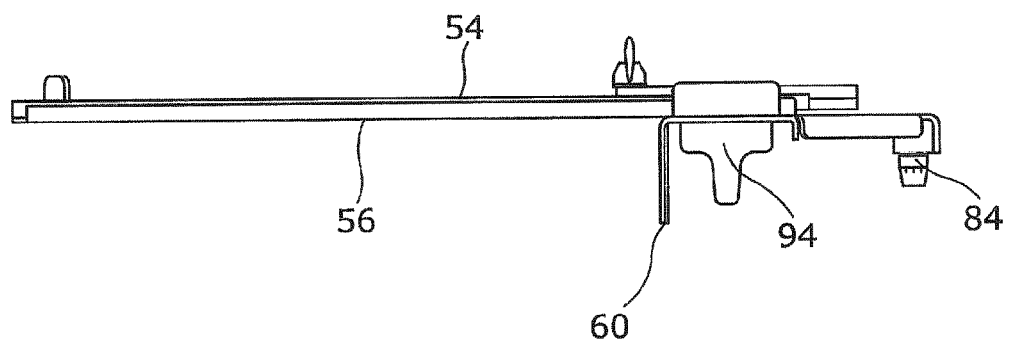

In one embodiment, the said router apparatus is selectively useable in conjunction with a selectively attachable component typically know as a fence, and the router, such as that shown in FIG. 1 is selectively attachable to the fence at the base 8 which is located on the surface 54 of the fence body 52. A perspective view of the fence is shown in FIG. 4a, plan views are shown in FIGS. 4b and c, and an end and side view is shown in FIGS. 4d and e respectively.

The fence body 52 is provided with first and second opposing surfaces 54,56 and includes an aperture 58 through which the cutting head 10 and tool 24 of the router 2 pass to contact with the workpiece 32 so that it will be appreciated that the fence, in use of the apparatus, is located intermediate the router 2 and the workpiece 32 as illustrated schematically in FIG. 4f. The fence is provided with a plurality of guides which, in this embodiment, include a fence surface 60 which depends outwardly from the surface 56 and a guide plate 62 is also provided. The fence is slidably moveable as indicated by arrows 64,66 along the tracks 68,70 located adjacent the opposing edges of the fence and the guide plate 62 is slidably moveable along ridge portions 72 which, in this embodiment is located along a central longitudinal axis of the plate and which intersects the aperture through which the tool of the router passes. It will be appreciated that the location of the fence and the location of the guide plate, can be adjusted to suit the particular work operation which is to be performed. Typically, the fence is provided to be located against an edge 74 of the workpiece 32 on which the work operation is to be performed so as to locate the cutting tool of the router 2 with respect to a known location at a distance from the edge of the workpiece and the guide plate 62 is selectively located so as to adjust and set the circle radius and may be set, in one example to small, medium and large radii.

In the embodiment shown, the guide plate extends outwardly from both surfaces 54,56 of the fence body so as to be useable as a guide when the router tool 2 is located on the fence surface 54 or fence surface 56.

Typically, the selected position of the guide plate 62 is secured in a required position via a manual locking means such as a locking knob 76 and a wingnut 78. The ridge portion 72 includes a longitudinal location means such as a channel 80, into which a ruler of a type and shape typically used in woodworking, can be located so as to allow the ruler to be used as a scale for accurate adjustment of the guide plate 62 with respect to the position of the fence 60 and in turn, the router 2. The ruler can be held in a selected position by the tightening of securing means 84 onto the ruler.

The fence plate 60 includes location means 82 to allow the location therewith of antifriction, sacrificial and/or protective portions of material which, when located to the fence surface act as the external surface of the same which is to be positioned against the workpiece edge and which, if they become worn or damaged, can be removed and replaced with new portions. A securing knob 94 is provided to be manually tightened to secure the position of the fence plate 60 with respect to the fence body 52.

In order for the guide and fence plates to be effective, it is necessary for the location of the fence plate 60 with respect to the router apparatus 2 to be accurate and maintained during use and this is achieved by the provision of first and second mounting apertures 86 on the fence body 52 which, as shown, are formed of a keyhole shape and which pass between the surfaces 54, 56 of the body. The mounting apertures 86 are provided to receive therein male members 88 provided on the router base 8 which can be moved through into the wider portions of the mounting apertures 86 and then relative sliding movement between the base and the fence body as indicated by arrow 90 allow the locking of the router and fence body in position. Upstanding tabs 92 also secure against the edge of the router base 8 when the same is in the locked position and thereby retaining the base 8 in a secure position with the fence body 52 during use of the apparatus.

The invention claimed is:

1. A power tool, said power tool including a housing, a motor, a shaft to be moved by an operation of the motor, a toolholder connected to the shaft, a power source connectable to provide electrical power to operate the motor and first switch to allow a user selective operation of the motor, said first switch including a no Voltage release (NVR) function and wherein means are provided to selectively disable the NVR function of the first switch when the power tool is used in at least one predetermined configuration of the power tool being useable in conjunction with a second switch provided in electrical connection with, and positioned remotely from, the housing of the power tool and which allows a selective operation of the power tool.

2. The power tool according to claim 1 wherein when in said at least one predetermined configuration the power tool is provided to be mounted on an underside of a worktable and in electrical connection with the said second switch.

3. The power tool according to claim 1 wherein the said second switch is located intermediate the power source and the first switch.

4. The power tool according to claim 1 wherein the second switch is provided as part of a switchbox mounted on, or positionable with respect to, a worktable or a surface on which a workpiece to be operated on by the power tool, is located.

5. The power tool according to claim 4 wherein mounting or position of the second switch is selectable so as to be accessible by a user of the power tool when the power tool is in the said at least one predetermined configuration.

6. The power tool according to claim 1 wherein an electrical connection for the second switch is a cable connection between the second switch and the motor within the housing of the power tool.

7. The power tool according to claim 1 wherein an on/off function of the first switch remains operable when the NVR function is disabled.

8. The power tool according to claim 1 wherein the said means to disable the NVR function includes a trigger mounted on the power tool and a coded member which is selectively brought into contact with the trigger to disable the NVR function of the first switch.

9. The power tool according to claim 8 wherein the trigger is a microswitch located in the housing as part of a power supply control system for an operation of the power tool.

10. The power tool according to claim 8 wherein said coded member is insertable from a position externally of a power tool housing through a port and into contact with the said trigger.

11. The power tool according to claim 8 wherein the said coded member and trigger are only operable to disable the NVR function of the first switch when the power tool is positioned in the said at least one predetermined configuration and said second switch is provided in electrical connection therewith.

12. The power tool according to claim 1 wherein the power tool includes a detection means to determine when the power tool is in the said at least one predetermined configuration and only allow disabling of the NVR function of the first switch when said at least one predetermined configuration is detected.

13. The power tool according to claim 8 wherein the said coded member is only physically moveable so as to be capable of being used when the power tool is in a second configuration.

14. The power tool according to claim 13 wherein the said coded member is located such that when the power tool is to be moved from the said at least one predetermined configuration, the said coded member has to be removed from a position in which the NVR function of the first switch is disabled.

15. The power tool according to claim 1 wherein the power tool is a router power tool and the said at least one predetermined configuration is the router power tool mounted on an underside of a worktable or surface on which a workpiece is locatable.

16. The power tool according to claim 1 wherein the said means for disabling the NVR function of the first switch includes an actuating member permanently attached to an underside of a worktable.

17. The power tool according to claim 16 wherein a user is required to remove a coded member from a router housing in order to be able to move the power tool from an underside of a worksurface and/or the coded member cannot be moved to a position to act to disable the NVR function when the power tool is in any configuration of use in which only the first switch is used to operate the power tool.

18. The power tool according to claim 1 wherein when the power tool is in the said at least one predetermined configuration and the NVR function of the first switch is disabled, only the second switch is usable to switch the router power tool on and off and the second switch has an NVR function.

19. A kit of parts to allow a power tool to be used in at least first and second configurations and for a switch for the said power tool to be adapted with respect to a particular configuration in which the power tool is to be used at a particular time, said kit comprising a power tool including a housing, a motor for a selective operation to rotate a cutting head and first and second switches and a power supply selectively provided to rotate the motor via operation of the first or second switches, said second switch located intermediate a source of the power supply and the first switch and wherein a disabling assembly is provided to selectively allow at least one function of the first switch to be selectively disabled when the second switch is to be used to operate the said power tool when the power tool is in the said second configuration and wherein the disabling assembly is provided to only be capable of operation to disable a function of the first switch when the power tool is in the second configuration.

20. The kit of parts according to claim 19 wherein the kit further includes a worktable and means to allow the power tool to be operated in a first configuration on a topside of a workpiece located on an upper surface of a worktable and a second configuration which the power tool is operated with respect to a lower side of the workpiece and the power tool is located on the underside of the worktable.

21. A method for operating a power tool which is capable of being operated in at least two configurations and wherein, when the power tool is operated in at least one predetermined configuration, means are provided to be selectively used to disable an NVR function of a first switch of the power tool which are located with a housing of the power tool and when disabled, an operation of the power tool is provided via operation of a second switch which is physically remote from the said housing of the power tool and electrically connected t the power tool, with the second switch useable by an operator when the power tool is in the said at least one predetermined configuration.

* * * * *

UNITED STATES PATENT AND TRADEMARK OFFICE
CERTIFICATE OF CORRECTION

| | | |
|---|---|---|
| PATENT NO. | : 12,466,046 B2 | Page 1 of 1 |
| APPLICATION NO. | : 18/261217 | |
| DATED | : November 11, 2025 | |
| INVENTOR(S) | : Daniel Pikarski | |

It is certified that error appears in the above-identified patent and that said Letters Patent is hereby corrected as shown below:

In the Claims

Column 11, Line 4 replace "t" with --to--

Signed and Sealed this

Thirteenth Day of January, 2026

John A. Squires
*Director of the United States Patent and Trademark Office*